(Model.)

F. E. ARNOLD.
Permutation Lock.

No. 232,914.    Patented Oct. 5, 1880.

WITNESSES:
Donn P. Twitchell
C. Sedgwick

INVENTOR:
F. E. Arnold
BY Munn & Co
ATTORNEYS.

UNITED STATES PATENT OFFICE.

FRED E. ARNOLD, OF CHICAGO, ILLINOIS.

PERMUTATION-LOCK.

SPECIFICATION forming part of Letters Patent No. 232,914, dated October 5, 1880.

Application filed June 23, 1880. (Model.)

*To all whom it may concern:*

Be it known that I, FRED ERNEST ARNOLD, of Chicago, in the county of Cook and State of Illinois, have invented a new and useful Improvement in Combination-Locks, of which the following is a specification.

My invention consists in certain novel details of construction, arrangement, and combination of a sliding bolt, gear-wheels, and setting devices, whereby provision is made for securing the bolt to prevent it from being moved without a knowledge of the necessary arrangement of the parts with relation to each other.

Figure 1:
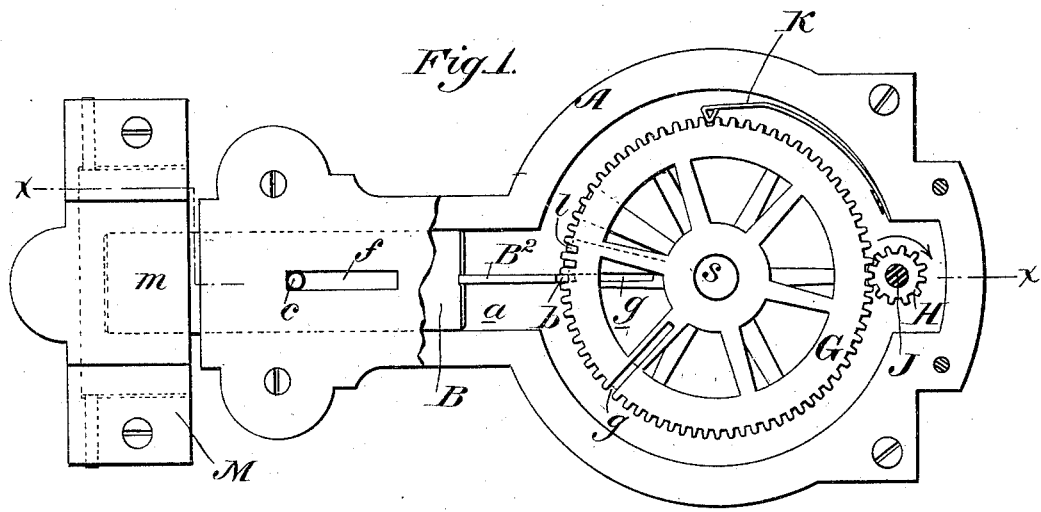
Figure 2:
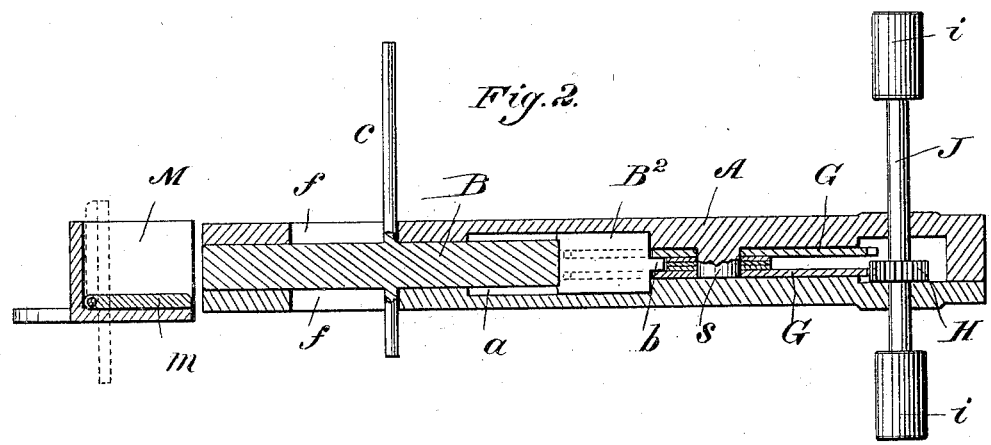
Figure 3:
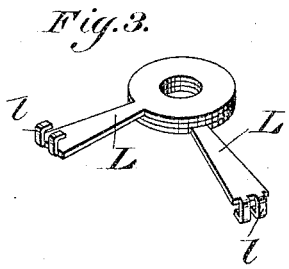

In the accompanying drawings, Figure 1 is a plan view of the lock with a portion of the outer plate removed. Fig. 2 is a longitudinal section taken in the line $x\ x$ of Fig. 1. Fig. 3 is a detail view.

Similar letters of reference indicate corresponding parts.

The working parts of the lock are inclosed in a metallic frame or case, A, the main portion of which is nearly circular in form, with a radial extension on one side.

The bolt B slides longitudinally in a seat, $a$, in the interior of the radial extension, and in the larger portion of the case are two gear-wheels, G G, arranged to turn on a pivot consisting of a stud, $s$.

The rear end of the bolt is provided with a flat shank or tongue, $B^2$, the extreme end of which terminates in a lip or lug, $b$. The bolt is provided with a handle, $c$, projecting from the case through slots $j$, for the purpose of moving it by hand.

Each of the gear-wheels is provided with a radial notch, $g$, for engagement with the shank or tongue of the bolt, as hereinafter described, and each wheel may be provided with any suitable number of teeth.

The key consists of a pinion, H, carried by a shaft, J, working in bearings in the frame or case A, and provided with knobs $i$ at its end. The pinion is fast on the shaft, which is arranged to slide longitudinally in its bearings sufficiently to allow the pinion to engage with the gear-wheels alternately.

Each gear-wheel is engaged by a spring-pawl, K, one end of which is attached to the case A, and the other end is provided with a nose which engages with the teeth of the wheel. The nose of the pawl is sufficiently tapered or rounded to hold the wheel in place when not turned by the key, but to allow the teeth to slip by it when the key is applied to turn the wheel.

L (see Fig. 3) represents an arm extending radially from a ring which fits on the stud or pivot $s$. The end of the arm is forked and hooked for engagement with the teeth of the gear-wheel, as shown in Fig. 1, there being one of said arms for each wheel. The two arms are placed in position on the stud or pivot $s$, between the two wheels G G, with their forked hooks $l$ engaging with the teeth of their respective wheels.

The bolt being locked, in order to unlock it the pinion H is turned in the direction of the arrow in Fig. 1 until the forked hook $l$ of one arm abuts against the lip or lug $b$. The pinion is then turned in the reverse direction until the radial notch $g$ of one wheel is exactly in line with the shank or tongue $B^2$. The key is then shifted and the same motions applied to the other wheel. This brings both of the notches $g$ in line with the shank, so as to allow the bolt to slide back.

In order to secure the bolt when locked, so as to prevent it from being moved back, the key is turned in either direction, so as to throw one or both of the notches out of line with the shank or tongue.

In setting the lock the forked hook $l$ is engaged with the wheel at a certain number of teeth from the notch $g$, and in the reverse motion of the key, above described, the wheel is turned a distance corresponding with the distance of the hook from the notch. This distance is ascertained by means of the spring-pawl K, the nose of which slips over the teeth one by one, and the movements of which can be heard or felt by the person manipulating the key. For example, if the arm is adjusted to engage with the third tooth from the notch, then in the reverse movement the wheel will be turned until the nose of the pawl has slipped over three of the teeth, which movement will bring the notch in line with the shank, as before described.

The bolt can be locked by means of either one of the wheels, and any suitable number of wheels may be employed. The two shown are sufficient for illustration.

It is obvious, however, that a greater number of wheels will increase the difficulty of unlocking the bolt by a person not knowing the combination, especially if they are set at different distances as to the position of the notches with relation to the shank or tongue of the bolt. The keeper used in connection with this bolt consists of a box, M, similar in shape to others heretofore used; but instead of being all in one solid piece the front or locking side is provided with a plate, m, which is pivoted or hinged so as to swing inward toward the interior of the box, but not outward. If the door to which the bolt is attached should be suddenly closed while the bolt is protruding from the case, the plate m will swing inward, so as to allow the door to close without injury to either the lock or the keeper.

Having thus fully described my invention, I claim as new and desire to secure by Letters Patent—

1. A combination-lock consisting of a sliding bolt, B, having a flat shank or tongue terminating in a lip or lug, b, one or more gear-wheels, G, each provided with a radial notch, g, a setting device consisting of a radial arm, L, extending from a ring and terminating in a forked hook, l, a spring-pawl, K, and a key consisting of a shaft, J, and pinion H, arranged to engage with the wheel or wheels G, all arranged and operating substantially as and for the purposes herein shown and described.

2. The combination, with the toothed wheel G and the lip or lug b, of the arm L, extending radially from a ring fitting on the stud s, and terminating in a forked hook, l, as shown and described, for the purpose specified.

FRED ERNEST ARNOLD.

Witnesses:
WALTER ARNOLD,
WILLIAM MONROE.